United States Patent
Braquet et al.

[19]

[11] Patent Number: 6,062,738

[45] Date of Patent: May 16, 2000

[54] DATA COMMUNICATIONS APPARATUS HAVING IMPROVED SHIELDING STRUCTURE

[75] Inventors: Henri Braquet, Aspremont; Patrice Carrez, St-Laurent-du-Var; Jean Lehouchu, Cagnes-sur-mer; Thierry Sordello, Nice, all of France

[73] Assignee: International Business Machines Corporation, Armonk, N.Y.

[21] Appl. No.: 09/089,182

[22] Filed: Jun. 2, 1998

[30] Foreign Application Priority Data

Jun. 13, 1997 [EP] European Pat. Off. .............. 97480032

[51] Int. Cl.[7] ...................................................... G02B 6/38
[52] U.S. Cl. ................................................................ 385/59
[58] Field of Search ..................................... 385/59, 77–80

[56] References Cited

U.S. PATENT DOCUMENTS

| | | | |
|---|---|---|---|
| 5,386,487 | 1/1995 | Briggs et al. | 385/59 |
| 5,608,830 | 3/1997 | Belenkiy et al. | 385/78 |
| 5,971,625 | 10/1999 | Lu | 385/60 |

*Primary Examiner*—Akm E. Ullah
*Attorney, Agent, or Firm*—Daniel E. McConnell

[57] ABSTRACT

Data communications apparatus is described having a duplex SC connector comprising two parallel connection assemblies integrated into a single component for connecting two optical fiber cables with two optical fiber transceivers and a shielding structure arranged to, at least in part, reduce electromagnetic emissions from the optical fiber transceivers, characterised by a conductive member extending between the parallel connection assemblies, the conductive member being in conductive contact with the shielding structure at both sides of the duplex connector.

5 Claims, 2 Drawing Sheets

DATA COMMUNICATIONS APPARATUS HAVING IMPROVED SHIELDING STRUCTURE

FIELD OF THE INVENTION

The invention relates to data communication apparatus and more particularly to a duplex connector having an improved shielding structure for reducing electromagnetic emissions from the apparatus.

BACKGROUND DESCRIPTION

In modern high speed telecommunications, fiber optic cables are widely used to interconnect various types of communications apparatus.

There is known in the art a type of fiber optic connector known as an SC connector. The physical dimensions of such SC connectors are documented in industry standard JIS-C5973 and they are widely available commercially in either simplex or duplex form. The primary function of such a connector is to align an optical transmission fiber mechanically to an optical port on a component such as a receiver or transmitter.

However, the use of duplex SC connectors in the latest generation of high speed digital data communications apparatus, which employ data rates of up to 622 Mbits per second, has been found to lead to unacceptable levels of electromagnetic emissions—this despite the conventional shielding structures typically employed in such apparatus.

Nevertheless, the convenience and relative low cost of duplex SC connectors means that it would be highly desirable to be able to use them in high speed apparatus, rather than to resort to specially designed shielded connectors.

SUMMARY OF THE INVENTION

It is an object of the present invention to enable a standard commercially available duplex fiber optic connector to be used at the very high data rates required by modem digital data communications apparatus.

In brief, this object is achieved by providing a conductive member extending between the parallel connection assemblies, the conductive member being in conductive contact with the shielding structure at both sides of the duplex connector.

The inventors have found by experiment that at a 622 Mbit/S data rate the radiated emissions from a fiber optic transducer can still be very significant at frequencies as high as the fifth harmonic of the highest frequency used. For a frequency of 622 MHz, the fifth harmonic is as high as 3.11 GHz which corresponds to a wavelength of less than 10 cm. Since the long physical dimension of a standard duplex SC connector is about 2.3 cm it is thought that the size of the aperture required to accommodate the connector in a conventional shielding structure is too large to provide sufficient attenuation of the EM radiation emitted by the optical fiber transducers.

By effectively dividing the aperture in two, the conductive member has been found to provide a substantial and somewhat unexpected improvement in the attenuation of the emitted radiation and, in particular, to reduce the emitted radiation of the apparatus as a whole to within levels required by FCC regulations and other widely applicable standards. This is achieved without impairing the insertion or removal of connectors at the ends of the optical fiber cables.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENT OF THE INVENTION

Figure 1:
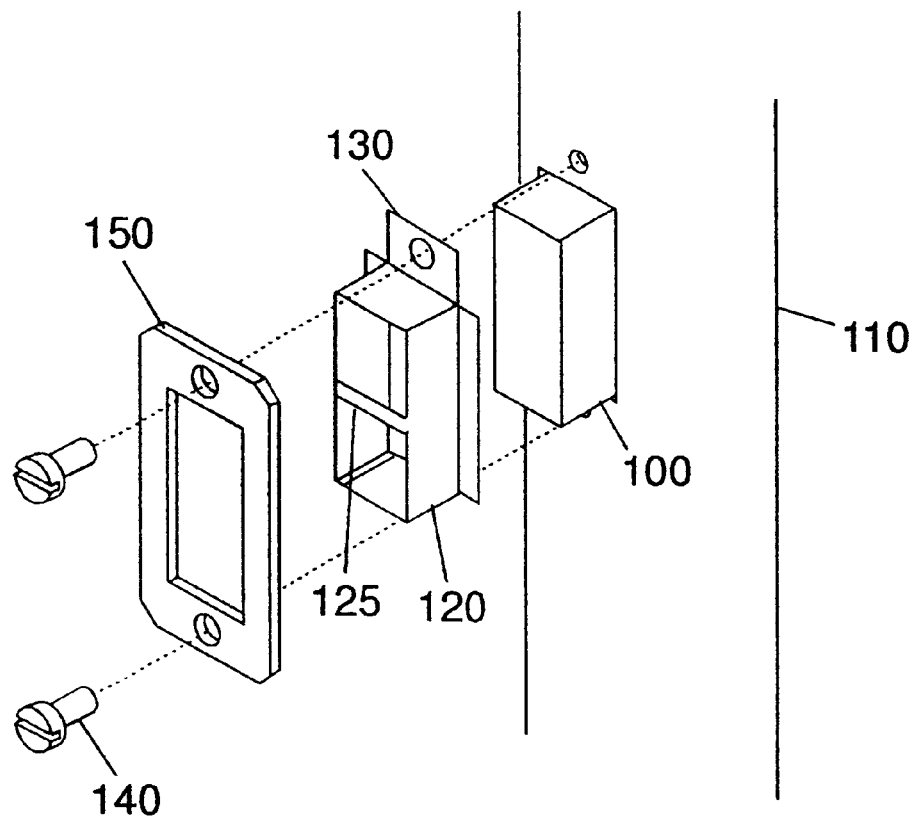
FIG. 1 is an exploded perspective view of part of a connector structure incorporating the invention.

Referring to FIG. 1. there is shown an exploded perspective view of part of a connector structure including the invention. The apparatus has a female duplex SC connector 100 for receiving a male duplex SC connector (not shown) so as to align two optical transmission fibers terminated in the male duplex SC connector to optical ports on transducers (not shown) within an apparatus. Such SC connectors and transducers are well known in the art. Details of the SC connector 100 have been omitted from the illustration as such details are not needed to understand the present invention.

In a preferred embodiment, SC connector 100 is a 622 Mbps Multimode Fiber Transceiver with part number HFBR-5207 available from Hewlett Packard Company, which includes an integral duplex SC connector receptacle.

The apparatus comprises a housing 110 which forms a shielding structure arranged to reduce electromagnetic emissions from the electronics within the apparatus, including the optical fiber transducers.

An apertured cap 120 is mounted on a portion of the connector 100 which projects from housing 110. Apertured cap includes a thin conductive strip 125 of width about 2 mm which extends between the parallel connection assemblies in the duplex connector. Since the SC standard connector structure includes a small gap between the two sets of optical fiber components, the presence of strip 125 does not impair the insertion or removal of male connectors.

Cap 120 includes flanges, such as flange 130, to insure that the caps is in conductive contact with housing 110 at both sides of connector 100. Cap 120 is secured to housing by screws 140 and faceplate 150, which ensures good electrical contact between cap 120 and housing 110.

Figure 2:
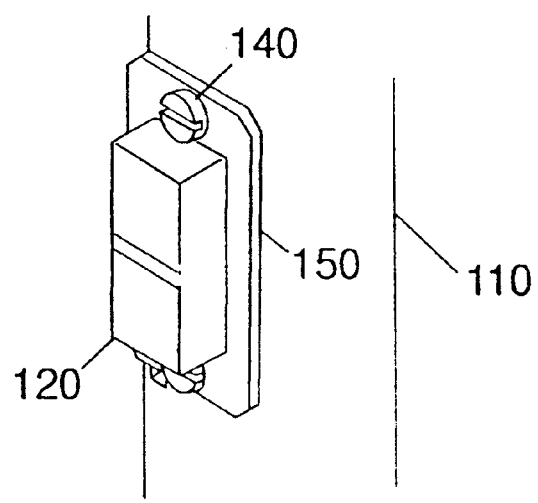
FIG. 2 shows a perspective view of the assembled structure of FIG. 1.

FIG. 2 shows a perspective view of the assembled structure.

Strip 125, which effectively divides the aperture provided for connector 110 in two, has been found to provide a substantial improvement in the attenuation of the emitted electromagnetic radiation.

Figure 3:
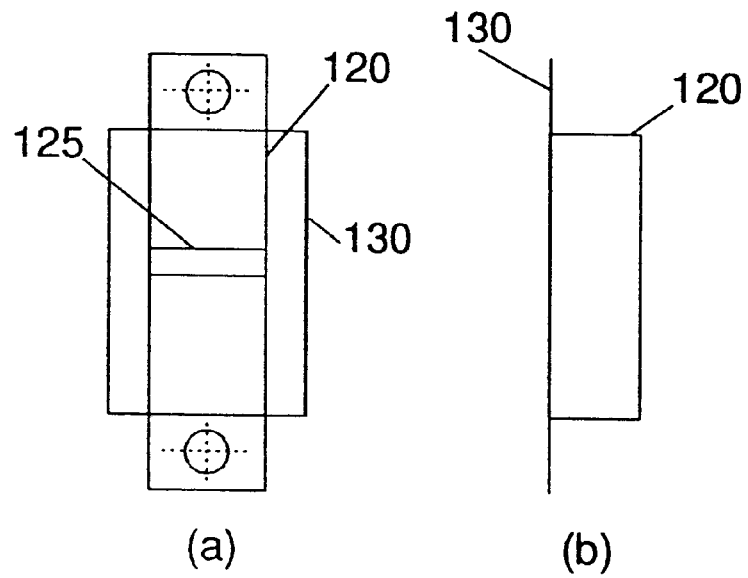
FIGS. 3(a) and (b) show front and left side views respectively of a conductive cap in the structure of FIG. 1.

FIGS. 3(a) and (b) show front and left side views, respectively, of cap 120.

Figure 4:
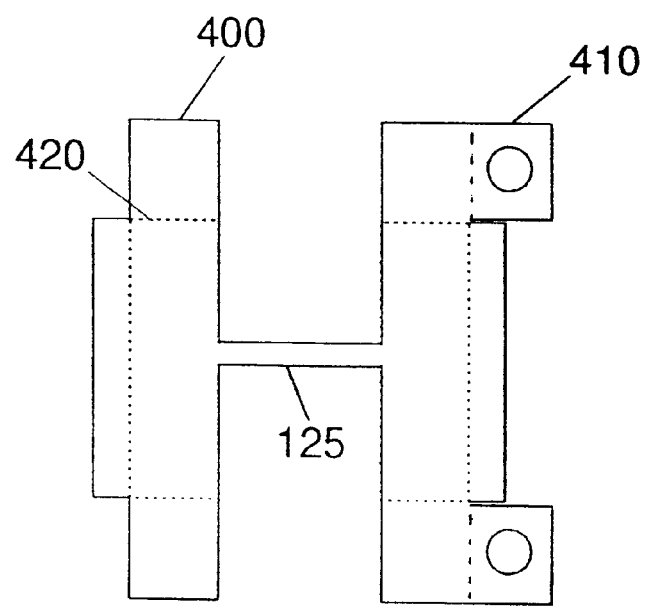
FIG. 4 shows the shape of a metal cut-out from which the cap of FIG. 3 is formed.

In a preferred embodiment, cap 120 is a folded structure formed from a single metal sheet blank as shown in FIG. 4. The blank structure comprises first and second portions 400 and 410 respectively connected by strip 125. To produce the cap, the blank is folded at fold lines 420. In the preferred embodiment, the sheet is stainless steel with thickness 0.2 mm.

While the invention has been described in terms of a preferred embodiment, those skilled in the art will recognize that the invention can be practiced with modifications within the spirit and scope of the appended claims.

Having thus described our invention, what we claim as new and desire to secure by Letters Patent is as follows:

1. Apparatus comprising:
   a housing;
   a duplex connector mounted in said housing to receive two optical fiber cables in a single integrated component; and
   an apertured cap of electrically conductive material mounted on said housing and encircling said duplex connector, said cap reducing electromagnetic emissions and having a strip extending between the locations at which the two optical cables are received in said duplex.

2. Apparatus according to claim 1 wherein said connector is a standard SC connector.

3. Apparatus according to claim 2 wherein said connector is an optical fiber transceiver.

4. Apparatus according to claim 3 wherein said apertured cap encircles a portion of said optical fiber transceiver which protrudes from said housing.

5. Apparatus according to claim 4 wherein said apertured cap is formed from a single metal sheet blank.

* * * * *